(12) United States Patent
Els et al.

(10) Patent No.: US 9,715,699 B1
(45) Date of Patent: Jul. 25, 2017

(54) SYSTEM AND METHOD FOR PRICING ADVERTISEMENT PLACEMENTS ONLINE IN A REAL-TIME BIDDING ENVIRONMENT

(71) Applicant: MaxPoint Interactive, Inc., Morrisville, NC (US)

(72) Inventors: Michael Els, Durham, NC (US); Igor Postelnik, Austin, TX (US)

(73) Assignee: MaxPoint Interactive, Inc., Morrisville, NC (US)

( * ) Notice: Subject to any disclaimer, the term of this patent is extended or adjusted under 35 U.S.C. 154(b) by 328 days.

(21) Appl. No.: 13/857,123

(22) Filed: Apr. 4, 2013

Related U.S. Application Data

(60) Provisional application No. 61/621,379, filed on Apr. 6, 2012.

(51) Int. Cl.
*G06Q 30/02* (2012.01)
(52) U.S. Cl.
CPC ..... *G06Q 30/0275* (2013.01); *G06Q 30/0244* (2013.01); *G06Q 30/0254* (2013.01)
(58) Field of Classification Search
CPC ................... G06Q 30/0207–30/0277
See application file for complete search history.

(56) References Cited

U.S. PATENT DOCUMENTS

| 8,234,170 | B2 | 7/2012 | Kassakian et al. ........ 705/14.71 |
| 8,438,184 | B1 | 5/2013 | Wang et al. ................. 707/780 |
| 8,554,602 | B1 | 10/2013 | Zohar et al. ................. 705/7.33 |
| 8,799,062 | B1 | 8/2014 | Epperson et al. ........... 705/14.1 |
| 2003/0110171 | A1 | 6/2003 | Ozer et al. |
| 2003/0149937 | A1 | 8/2003 | Mcelfresh et al. ........... 715/210 |
| 2003/0195832 | A1* | 10/2003 | Cao et al. ........................ 705/37 |
| 2006/0106710 | A1 | 5/2006 | Meek et al. .................... 705/37 |
| 2007/0143171 | A1 | 6/2007 | Boyd et al. ................... 705/306 |
| 2007/0174114 | A1* | 7/2007 | Bigby et al. .................... 705/14 |
| 2008/0243824 | A1 | 10/2008 | Riise et al. |
| 2008/0249832 | A1 | 10/2008 | Richardson et al. ...... 705/14.46 |
| 2009/0132348 | A1 | 5/2009 | Bria et al. ....................... 705/35 |
| 2010/0138271 | A1 | 6/2010 | Henkin et al. ............. 705/14.54 |
| 2010/0198679 | A1 | 8/2010 | Kassakian et al. ........ 705/14.42 |

(Continued)

OTHER PUBLICATIONS

Econometric Models of Limit-Order Executions, Andrew Lo et al., Mar. 22, 2000, Massachusetts Institute of Technology.*

(Continued)

*Primary Examiner* — David Stoltenberg
(74) *Attorney, Agent, or Firm* — Slayden Grubert Beard PLLC

(57) ABSTRACT

A method and system for pricing advertisement placements online in a real-time bidding (RTB) environment is disclosed. According to one embodiment, a computer-implemented method includes receiving a plurality of responses from a plurality of real-time bidding (RTB) requests for an advertisement placement and determining a first data set from the plurality of responses, where the first data set includes prices paid for winning the advertisement placement. The computer-implemented method further includes determining a second data set from the plurality of responses, where the second data set includes losing bid prices, and estimating a price distribution curve based on one or more of the first data set and the second data set.

21 Claims, 12 Drawing Sheets

(56) References Cited

U.S. PATENT DOCUMENTS

| | | | |
|---|---|---|---|
| 2010/0228636 A1* | 9/2010 | Silverman | G06Q 30/02 705/14.72 |
| 2010/0250332 A1* | 9/2010 | Ghosh | G06Q 30/02 705/14.41 |
| 2010/0250362 A1* | 9/2010 | Bax | G06Q 30/02 705/14.43 |
| 2010/0262455 A1 | 10/2010 | Karlsson et al. | 705/14.45 |
| 2010/0317420 A1* | 12/2010 | Hoffberg | G06Q 30/0207 463/1 |
| 2010/0324974 A1* | 12/2010 | D'Ambrosio | G06Q 30/02 705/310 |
| 2011/0035276 A1* | 2/2011 | Ghosh | G06Q 30/02 705/14.46 |
| 2011/0040635 A1 | 2/2011 | Simmons et al. | 705/14.71 |
| 2011/0040636 A1* | 2/2011 | Simmons et al. | 705/14.71 |
| 2011/0166942 A1 | 7/2011 | Vassilvitskii et al. | 705/14.71 |
| 2011/0178840 A1* | 7/2011 | Ravichandran | 705/7.29 |
| 2011/0218955 A1* | 9/2011 | Tang et al. | 706/52 |
| 2011/0231264 A1 | 9/2011 | Dilling et al. | 705/14.71 |
| 2011/0258036 A1 | 10/2011 | Ioffe et al. | 705/14.43 |
| 2011/0258041 A1 | 10/2011 | Ioffe et al. | 705/14.46 |
| 2011/0258056 A1 | 10/2011 | Ioffe et al. | 705/14.73 |
| 2011/0276392 A1 | 11/2011 | Vaver et al. | 705/14.43 |
| 2011/0313851 A1* | 12/2011 | Athey | G06Q 30/02 705/14.46 |
| 2012/0030034 A1* | 2/2012 | Knapp | G06Q 30/02 705/14.71 |
| 2012/0041816 A1 | 2/2012 | Buchalter | 705/14.41 |
| 2012/0053991 A1 | 3/2012 | Shimizu et al. | 705/7.34 |
| 2012/0066066 A1 | 3/2012 | Jain et al. | 705/14.48 |
| 2012/0089455 A1 | 4/2012 | Belani et al. | 705/14.44 |
| 2012/0150626 A1 | 6/2012 | Zhang et al. | 705/14.42 |
| 2012/0158490 A1* | 6/2012 | Neumeyer | G06Q 30/0247 705/14.46 |
| 2012/0221409 A1 | 8/2012 | Grebeck et al. | 705/14.46 |
| 2012/0245990 A1 | 9/2012 | Agarwal | 705/14.25 |
| 2012/0310729 A1 | 12/2012 | Dalto et al. | 705/14.43 |
| 2012/0323674 A1 | 12/2012 | Simmons et al. | 705/14.41 |
| 2013/0066725 A1 | 3/2013 | Umeda | 705/14.66 |
| 2013/0198011 A1 | 8/2013 | Corner et al. | 705/14.71 |
| 2013/0346218 A1 | 12/2013 | Liu et al. | 705/14.71 |
| 2014/0032306 A1 | 1/2014 | Sukornyk et al. | 705/14.43 |
| 2014/0040015 A1 | 2/2014 | Haley et al. | 705/14.45 |
| 2014/0229273 A1 | 8/2014 | Garcia-Martinez et al. | 705/14.46 |

OTHER PUBLICATIONS

Nonparametric Approaches to Auctions, Athey and Haile, May 6, 2005.*

Censored depth quantiles, Debruyne et al., Computational Statistics and Data Analysis, May 13, 2007.*

Likelihood Estimation for Censored Random Vectors, Schedler, Wendelin, Alfred-Weber-Institut, Universität Heidelberg, Apr. 11, 2005.*

Predicting Winning Price in Real Time Bidding with Censored Data, Wu et al., Association for Computing Machinery, KDD'15, Aug. 10-13, 2015.*

United States Non-Final Office Action, U.S. Appl. No. 13/831,252, 25 pages, Apr. 27, 2015.

United States Non-Final Office Action, U.S. Appl. No. 13/831,307, 32 pages, May 12, 2015.

United States Final Office Action, U.S. Appl. No. 13/672,698, 10 pages, Nov. 7, 2014.

Chen, Ye et al., "Real-Time Bidding Algorithms for Performance-Based Display Ad Allocation," Association for Computing Machinery, 9 pages, Aug. 21, 2011.

United States Final Office Action, U.S. Appl. No. 13/831,252, 50 pages, Nov. 9, 2015.

United States Non-Final Office Action, U.S. Appl. No. 13/831,252, 63 pages, Feb. 9, 2017.

Perlich, Claudia et al., "Bid Optimizing and Inventory Scoring in Targeted Online Advertising," Media6Degrees, 9 pages, Aug. 12, 2012.

United States Non-Final Office Action, U.S. Appl. No. 13/672,698, 16 pages, May 27, 2014.

U.S. Non-Final Office Action, U.S. Appl. No. 14/711,130, 40 pages, Apr. 12, 2017.

* cited by examiner

SYSTEM AND METHOD FOR PRICING ADVERTISEMENT PLACEMENTS ONLINE IN A REAL-TIME BIDDING ENVIRONMENT

CROSS-REFERENCE TO RELATED APPLICATIONS

This application claims priority to U.S. Provisional Application Ser. No. 61/621,379, entitled "System and Method For Optimizing Real-Time Bidding On Online Advertisement Placements" and filed on Apr. 6, 2012, the disclosure of which is hereby incorporated by reference in its entirety.

FIELD

The present disclosure relates in general to the field of computer software and systems, and in particular, to a system and method for pricing advertisement placements online in a real-time bidding environment.

BACKGROUND

Online advertisement placements generally refer to the slots or space on the pages of a website that are available for displaying advertisements along with its content. Advertisers typically bid on these advertisement placements that are made available through real-time bidding (RTB) exchanges such as AdX, Admeld, Pubmatic, etc.

From a mechanical perspective, this requires a bidding server to have computer hardware linked to the RTB exchanges. The bidding server then receives bid requests via the RTB exchanges. A bid request occurs when a user/internet surfer visits a website/publisher that is selling their advertisement space on an RTB exchange. Upon receiving a bid request, the bidding server has a very short period of time within to respond to this request (generally around 50-100 ms or less). Since this bid response needs to occur in a very short period of time, it is difficult to run large scale models to predict what advertisements to buy and what price to pay for them.

Traditionally, an advertiser manually made simple static rules to be carried out at bid time. The advertiser observes and determines which domains were available on the exchanges. The advertiser selects the domains to bid on by entering them into an excel document. Then, after several days, the advertiser receives a report and visually weighs each domain against its click-through-rate ("CTR") to decide if the advertisement performed adequately. The CTR refers to the percentage of times users click on the advertisements given the number of times the advertisements are displayed ("impressions"). The advertiser removes poor performing domains and adds new domains. This traditional approach is largely a process of trial and error that relied to a great extent on human memory and human judgment in an effort to meet CTR goals and to ensure enough domains are chosen so that the campaign meets the periodic impression quota. Therefore, this traditional approach is more prone to human errors. Furthermore, because domains are generally bid on with a single static price, advertisers often pay too much for advertisement placements or do not win more valuable bids at the set price.

SUMMARY

A method and system for pricing advertisement placements online in a real-time bidding (RTB) environment is disclosed. According to one embodiment, a computer-implemented method includes receiving a plurality of responses from a plurality of real-time bidding (RTB) requests for an advertisement placement and determining a first data set from the plurality of responses, wherein the first data set includes prices paid for winning the advertisement placement. The computer-implemented method further includes determining a second data set from the plurality of responses, wherein the second data set includes losing bid prices and estimating a price distribution curve based on one or more of the first data set and the second data set.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to

DETAILED DESCRIPTION

A method and system for pricing advertisement placements online in a real-time bidding (RTB) environment is disclosed. According to one embodiment, a computer-implemented method includes receiving a plurality of responses from a plurality of real-time bidding (RTB) requests for an advertisement placement and determining a first data set from the plurality of responses, wherein the first data set includes prices paid for winning the advertisement placement. The computer-implemented method further includes determining a second data set from the plurality of responses, wherein the second data set includes losing bid prices and estimating a price distribution curve based on one or more of the first data set and the second data set.

It is an objective of the present system and method to provide a mechanism to consider multiple large data sets in the decision processing in such a way that can be acted upon in a time frame required for real-time bidding.

The present system and method allows advertisers to automatically and smartly bid on advertisement requests on RTB exchanges in an optimal manner while reaching a target goal of an advertising campaign. Moreover, the present system determines how best to buy advertisement placements in an RTB environment in a manner that maximizes the campaign goals at market efficient prices and that meets the required impression quota. Campaign goals may take the form of: a particular demographic audience, a desired CTR, a desired cost per click, a video view rate, a number of online purchases/actions, a desired cost per purchase/action, offline sales, or maximize the rate at which any target event occurs. It is noted that the present system and method refers specifically to CTR, but it may be applied to any other feedback parameters than CTR.

Defining Advertisement Placements

Typically, the number of unique advertisement requests that are found in an RTB is in the order of billions. In an effort to efficiently manage the massive amount of information on RTB exchanges, it is advantageous to create a structure to classify the billions of unique advertisement placements into fewer, optimizable components.

Figure 8:
FIG. 8 illustrates an example of an advertisement placement, according to one embodiment.

According to one embodiment, advertisement placements may be grouped by segments. For instance, an advertisement placement may be defined using the following structure: {RTB exchange, Domain, Segment1, Segment2, . . . , SegmentN, Ad Size, Ad position}. To illustrate, consider the advertisement placement shown in FIG. 8 for the web address http://www.foxnews.com/politics/2012/03/07/ustice-department-threatens-apple-publishers-with-lawsuits-over-alleged-e-book/. Applying this structure, the advertisement placement may be defined as follows:

Exchange: AdX
Domain: foxnews.com
Segment1: politics
Segment2: 2012
Segment3: 03
Segment4: 07
Segment5: justice-department-threatens-apple-publishers-with-lawsuits-over-alleged-e-book
Ad Size: 728×90
Ad Position: Above the fold Grouping advertisement placements into different advertisement segments allows probabilistic statements to be made because probabilistic statements require a sample. Observing and evaluating individual URLs as placements by themselves does not allow easily for statements regarding what works according to any metric. By grouping URLs together into advertisement placements, useful statistical inferences are made.

Statistically, the rarer an event, a larger sample size is needed to be able to accurately measure its efficacy. Campaign goals (metrics) are rare events that vary greatly. An advertisement placement should be defined in such a way that the sample size is sufficiently large to make probabilistic statements. For instance, consider CTR goals for display and video advertisements. Because clicks are a much rarer event on display advertisements than they are on video advertisements (e.g., 0.1% vs 2% CTRs on average), the above advertisement placement may be defined more broadly for a display campaign:

Exchange: AdX
Domain: foxnews.com
Ad Size: 728×90
Ad Position: Above the fold

While for a video campaign, the above advertisement placement may be defined more narrowly:

Exchange: AdX
Domain: foxnews.com
Segment1: politics
Segment2: 2012
Ad Size: video ad
Ad Position: Above the fold Thus, defining an advertisement placement may include the number of impressions that have been served on the placement, and how rare are the occurrences of the event that is being optimized. Generally, the more information that is available for an advertisement placement or the more common the occurrences of an event are, the more granularly the advertisement placement may be defined. Advertisement placements may be defined or redefined on the fly for every campaign and every performance metric.

The end result is a dynamic dataset that evolves as advertisements are served. This dataset is unique and dynamically changes every time the data is processed. The present system and method groups URLs into placements as granularly as it can, while still retaining sufficient information for inference. The granularity depends on:

the efficacy of the placement; the higher the success rate, the fewer impressions are needed for inference.

the similarity of the placement; if the placement performs on par with those around it, then it does not get broken out into a separate placement. Those placements that perform above or below the expectation get broken into different placements.

Placement Recommendation

After defining the advertisement placement set for each campaign, the next step is to rank all the advertisement placements for each campaign given the knowledge of all placement performance across all known campaigns including previous and on-going campaigns.

Figure 1:
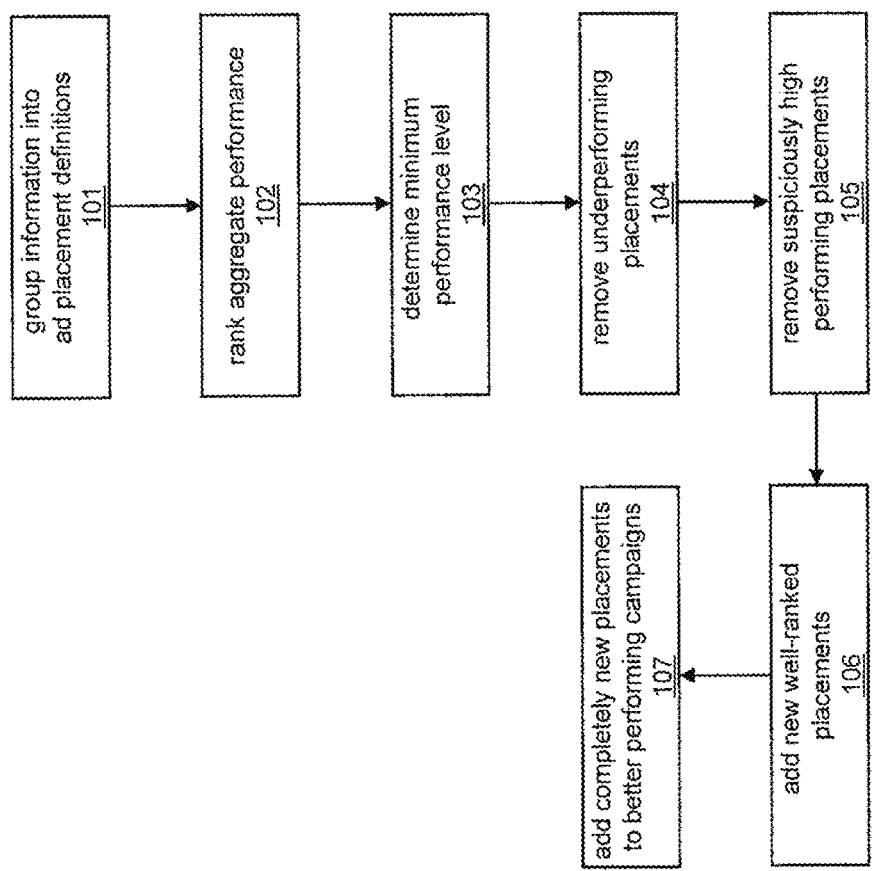
FIG. 1 is a flow-chart that illustrates a process for selecting advertisement placements based on popularity, according to one embodiment.

FIG. 1 is a flow-chart that illustrates a process for selecting advertisement placements based on popularity, according to one embodiment. Starting at 101, impression and various other forms of information from all known campaigns are grouped together into advertisement placement definitions. Other forms of information may, for instance, include cross campaign placement comparisons that reveal whether certain advertisement sizes are more effective than others. It may also include domain categories that are used to manipulate rankings and to help the system learn whether some content categories consistently outperform others.

The advertisement placements are then ranked based on their aggregate performance across all the previous campaigns. At 102, all advertisement placements served within each campaign are ranked. At 103, minimum and maximum desired performance levels for the advertisement placements for each on-going or currently-active campaign are determined. Thus, each campaign is associated with its own minimum and maximum levels. At 104, advertisement placements from each on-going campaign that do not meet a minimum performance level are removed. At 105, advertisement placements that have suspiciously high performance metrics are also removed as they may be indicative of non-human activity, such as those performed by spiders/crawlers that generate fake clicks. At 106, new advertisement placements are added to each on-going campaign based on their aggregate performance rank (determined at 101). At 107, some proportion of placements that are completely new to the system (e.g., no performance information from previous campaigns) may be added to the better performing, on-going campaigns. This allows the learning of performance information regarding speculative advertisement placements.

In addition to the selection process illustrated in FIG. 1, each campaign may be associated with specified "white lists" or "black lists" that may affect the ranking of advertisement placements. A white list may refer to a list of domains that are adequate for advertisement placements. This could be a list from a client, an internal list, or a list based on domain categories. A black list may refer to a list of sites that are excluded from the server because they that have deemed undesirable for a campaign. These lists may be applied to all optimizations.

Figure 2:
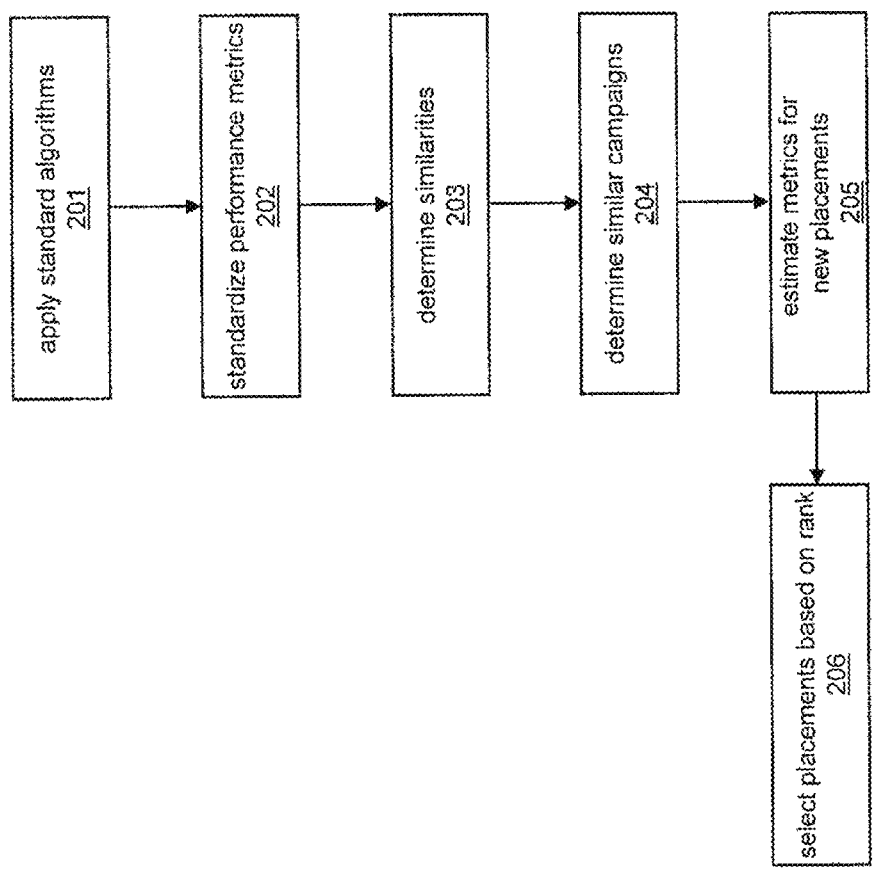
FIG. 2 is a flow-chart that illustrates an exemplary collaborative filtering process for selecting advertisement placements, according to one embodiment.

While the process of FIG. 1 selects advertisement placements based on their performance/popularity, a collaborative filtering process is also contemplated (this is not restricted to collaborative filtering, any matrix factorization or other recommendation technique is implied throughout the document where "collaborative filtering" is used). FIG. 2 is a flow-chart that illustrates an exemplary collaborative filtering process for selecting advertisement placements, according to one embodiment. Starting at 201, the performance of each advertisement placement is determined based on standard user-based recommendation (e.g., each campaign is treated as a user and each advertisement placement is treated as an item). At 202, the performance metrics are standardized for each campaign. At 203, Pearson (or other) similarity measures may be used to determine which campaigns are similar based on how they performed on like placements with like performance metrics. At 204, for each campaign, a number of other campaigns (e.g., 10) that are most similar to it are determined. Then, at 206, performance metrics for new placements may be estimated based on a weighted average of how similar campaigns performed on those placements. The weights may be based on how similar the other campaign is to the campaign of interest and how many impressions were served to each placement, and how certain the system is that the observed performance metric resembles the truth. Finally, at 206, the desired advertisement placements for a campaign may be selected based on their rank (e.g., based on weighted scores of observed performance or from performance scores of similar campaigns for each placement) and estimated performance metrics.

Figure 3:
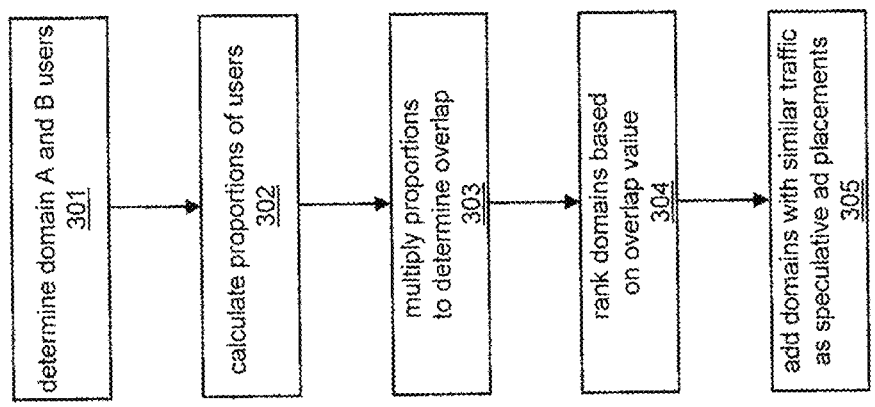
FIG. 3 is a flow-chart that illustrates an advertisement placement selection process based on similar user traffic, according to one embodiment.

In addition to the selection processes of FIGS. 1 and 2, it may also be desirable to select advertisement placements that are similar to top rated advertisement placements through similar user traffic. FIG. 3 is a flow-chart that illustrates an advertisement placement selection process based on similar user traffic, according to one embodiment. Starting at 301, users which have visited domain A (e.g., domain with top rated advertisement placements) and users which have visited domain B are determined. At 302, the proportion of users that visited domain A that also visited domain B is calculated $$\left(\text{e.g., } \frac{A \cap B}{B}\right).$$

Similarly, the proportion of users that visited domain B that also visited domain A is calculated $$\left(\text{e.g., } \frac{A \cap B}{A}\right).$$

At 303, these two values are multiplied together to define a similarity measure that equals "1" if the audience for both domains is exactly the same and "0" if domains A and B have no overlapping users. Using this measure, at 304, all other domains are ranked by how similar they are in terms of users to the top performing domain for any campaign. At 305, domains with similar traffic to a top performing domain are added as speculative advertisement placements. These advertisement placements may be biased towards the low volume domains because generally they will have a more precise audience.

Although the processes illustrated by FIGS. 1-3 have been described independently, it is contemplated that they may be used in combination with one another, such as in a tiered system, to facilitate the selection of advertisement placements for campaigns. Another process that may be applied to further facilitate the selection of advertisement placements is feature comparison across advertisement sizes, domain categories (e.g., news, sport, entertainment, technology, etc.), and campaign categories (e.g., Auto, CPG, insurance, etc.).

Figure 4:
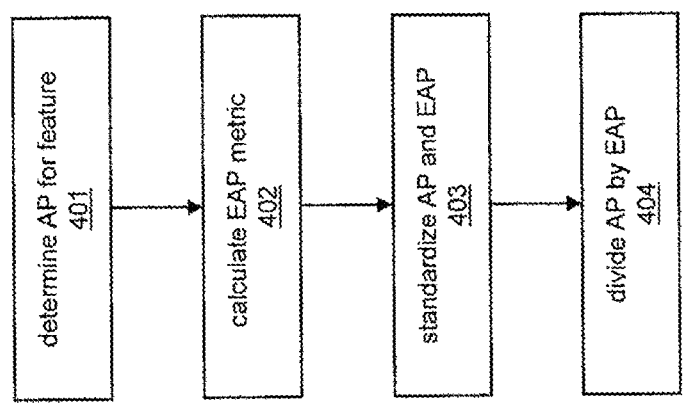
FIG. 4 is a flow-chart that illustrates an exemplary process for feature comparison for advertisement size categories, according to one embodiment.

FIG. 4 is a flow-chart that illustrates an exemplary process for feature comparison for advertisement size categories, according to one embodiment. Starting at 401, the aggregate performance ("AP") of advertisement placements by advertisement size is determined for a given campaign. At 402, the expected aggregate performance ("EAP") for each advertisement size across all other campaigns is calculated. The expected aggregate performance provides a measure of how it should have performed. At 403, both the values AP and EAP, found in 401 and 402, respectively, are standardized so that they are directly comparable. Finally, at 404, by taking the standardized AP value and dividing by the standardized EAP value, the system measures the difference between the actual performance by advertisement size and the expected performance. For instance, a value of "1" indicates that it is performing as expected and a value of "1.2" indicates that the advertisement size is performing 20% better than expect. The advertisement size is sent in the bid request. It represents the size of the advertisement slot available on the given URL.

While the above process of FIG. 4 is illustrated with respect to advertisement size comparison, it can be applied across any feature set. The result may also be averaged across all feature sets, for instance, to an adjustment centered around "1." The results may further be averaged by placement and multiplied by the estimated rating from the user-based recommender model of FIG. 2 to get an updated score estimate.

One issue that may be associated with selecting advertisement placements is a cold start problem. This problem refers to the situation in which campaign performance information over several advertisement placements may be unavailable for making an accurate recommendation for advertisement placement. One method to resolve this issue is to use item popularity to create a starting list. Another method is to pick the top N placements from all campaigns to ensure a good mix of placements and allow a campaign to select the best neighborhood of similar campaigns as fast as possible. Additionally, feature information based on campaign category may also be Included. For instance, if the new campaign is an insurance-based campaign, placements which worked best for other insurance-based campaigns may be determined. This may be accomplished using the same methods as described above without providing similarity data, but rather grouping campaigns or taking the top N placements out of a category. A mixture of these methods may be applied to help solve the cold start problem.

Digital Zip/User Targeting

Another aspect of the present system and method is grouping Internet Protocols (IPs) and IP ranges into clusters based on geographic location known as Digital Zips (DZs). This allows the optimization of DZs or IPs based on some performance metric, similar to how advertisement placements are optimized as described above. For instance, in the optimization of DZs or IPs, each DZ is treated as an item and each campaign as a user. This allows the system to use a similar user-based collaborative filtering approach described above. Furthermore, a similarity technique similar to the technique illustrated in FIG. 3 may be applied to find new DZs that are similar to good performing DZs based on traffic patterns.

Traditionally, advertisers target entire countries or large metropolitan areas. The present recommender system breaks these larger areas into much smaller neighborhoods for efficient targeting. The recommender system uses offline data such as census data, sales data and map the data to geographic areas to recommend good performing DZs or DZs that are expected to perform well for advertising.

As a campaign progresses, the recommender system receives performance feedback as to how DZs are performing. Performance feedback can be either sales or any online metrics such as click through rates. Performance feedback allows the recommender system to algorithmically learn and monitor the performance of geographic areas and when necessary to suggest stop advertising as well as making recommendations to new DZs to try for advertising.

DZ information can be layered and adjusted for spatial correlation using formal spatial models. When targeting areas to serve advertisements, a subset of available DZs may be chosen instead of all the available DZs. This allows the identification of DZs in the subset that perform well. Geographic neighbors to DZs that perform well are also more likely to perform well. Using standard spatial models, campaign performance may be estimated across the entire geographic space that are of interest for serving. Such standard spatial models include spatial Durbin model (SDM), spatial error model (SEM), spatial autoregressive model (SAR), conditional autoregressive model (CAR), and K-nearest neighbors methods. This way new DZs may be better selected, and poor performers may be thrown out. Such standard spatial models, for example, include spatial Durbin model (SDM), spatial error model (SEM), spatial autoregressive model, or the like.

This method can easily be combined with the user-based method. For example, performance correlations of each DZ may be estimated, standardized around "1," and then multiplied by the estimate score.

Price Optimization

Another aspect of the present system and method is price optimization. The RTB environment generally operates using a second price auction system. Advertisement placements have a clear price distribution around them and often have a price floor that moves over time. There is also a yearly price drift whereby placements increase in price over the year. There are also several cyclical components that occur within the year that affect all placements or some subset of placements (e.g. public holidays affect all placements while political events affect news and political placements only).

By looking at winning prices and win rates for placements that have been bid on, the present system estimates a price distribution that the market follows. The present system also estimates the price drift of this distribution over time.

Having estimated this distributional information, the system determines tradeoffs between lowering price and bid wins (impression volume). If the system observes that it is one of the highest bidders for an advertisement placement, then the system can lower its bid price substantially, lose marginal volume and have large decreases in the price paid. By doing this at scale across all placements, the system targets a desired win rate and given cost tailored to campaign volume, performance, and cost needs. The system determines tradeoffs between winning bid price and volume.

When there are lots of available impressions for a given placement, the system can strategically move down the price curve and maintain the same level of performance by effectively only buying the cheapest advertisements needed to meet the campaign's goals for that particular advertisement placement. Under some circumstances there are more advertisement placements available for purchase than required. Under these circumstances the present system strategically bids for the cheapest impressions within all advertisement placements, thus maintaining performance and impressions spread across the same number of placements. In this case, the system strategically buys the cheaper advertisements (at a lower price and thus lower win rate) while maintaining the performance.

In a given auction, there might be only one bidder. For all auctions, there is also an unknown and randomly changing price floor. Under these circumstances, the winning bid is set by the only bidder, and the present system exploits and targets placements by lowering the bid price until it reaches the current price floor. If it starts to lose all the time, it will raise price again. This applies when there is only one bidder in a given auction. Under some circumstances, the system can predict quite accurately when this is the case. When there is only one bidder, the system determines a bid price that reaches the cheapest win price (i.e., price floor). This holds performance and win rate constant while decreasing the cost significantly. If the cheapest win price is not known, a higher market price is chosen so as to determine the market curve.

Price Distribution Estimation for Advertisement Placements

Since a bidder in an RTB environment only sees a winning price if it is the highest bidder in an auction, from a statistics point of view, the bidder is operating in a right-censored data setting. A right-censored data setting occurs when the value of the winning price is above a certain price but unknown by how much. Specifically, if a bidder wins an auction, it observes the price it paid (i.e., a data point with full information that was drawn from the price distribution). On the other hand, if a bidder loses an auction, it knows that the highest bid was greater than its bid for that particular auction (i.e., a right-censored data point where the lower bound is a bidder's losing bid).

Suppose $T_i$ (i=1, 2, ..., n) are the highest bids among a bidder's competitors that are drawn independently and identically distributed from a price distribution F. Next, suppose that a bidder's bids $M_i$ are drawn independently and identically distributed from its own distribution G and that $T_i$ is censored on the right by $M_i$. In other words, the bidder observes a function:

$$(Z_i; \delta_i)$$

where $Z_i = \min(T_i, M_i)$ and $\delta_i = 1(T_i < M_i)$, and where $\delta_i$ denotes an indicator function that indicates whether an observation is fully observed or not. i.e., if $\delta_i = 1$, $T_i$ is less than $M_i$, and an observation is fully observed; if $\delta_i = 0$, $T_i$ is greater than $M_i$ and an observation is censored.

This situation fits into the field of survival analysis that involves a modelling of time to event data. For example, in medical studies, both the birth and death dates of a subject (e.g., patient) are known. In this case, complete data information data involving the subject may not be fully available prior to any analysis. For example, consider a medical study that measures the life expectancy of patients with cancer. In this study, some of the patients may die from an unrelated cause (e.g., car accident, and heart attack) and their exact date of death from the cancer is not known. It is only known that death would have occurred later than some point (i.e., a right-censoring data setting). Therefore, although survival analysis has traditionally been used in medical studies, this analysis is particularly relevant to an RTB environment where the right-censored environment is considered.

According to one embodiment, a bidder in an RTB environment is interested in inferring parameters of a price distribution that gives the probability F(t) of winning at some bid price t. Furthermore, using this price distribution, a bidder can derive the expected price that is conditional on winning, i.e., $E_F[T|T<t]$ which estimates the average price that a bidder pays per auction won at a bid price t. When this is translated into survival analysis, the bid price t is translated into a time t. F(t) provides the probability of a competitor's bid dying (i.e., do not win) before time t and $E_F[T|T<t]$ gives the average time of death for bids that died before time t.

The survival function S(t) that gives the probability Pr of a bid surviving until at least time t is represented by the equation:

$$S(t) = \Pr(T > t) = 1 - F(t),$$

where T is the time of death.

The likelihood function $L(\theta)$ of an estimator on censored data is a typical formula known to one ordinary skilled in the art, and further includes the information given by the censored data. The likelihood function $L(\theta)$ provides a function of the distributional parameters for the price distribution. For right censored data, the likelihood function $L(\theta)$ is given by:

$$L(\theta) = \prod_{i=1}^{n} f^{\delta_i}(t_i) S^{1-\delta_i}(t_i) = \prod_{i=1}^{n} f^{\delta_i}(t_i)(1 - F(t_i))^{1-\delta_i}$$

If the actual date of death (uncensored death) for a bid is at time $t_i$, the time $t_i$ is known and its contribution to the likelihood function $L(\theta)$ is as usual: the density f at the time of death, i.e., $t_i$. On the other hand, if a bid's censored death occurred at time $t_i$, then under non-informative censoring, the actual date of death would have exceeded time t, which contributes a censored observation's contribution at time $t_i$ to $S(t_i)$ that forms part of the likelihood function $L(\theta)$.

Figure 12:
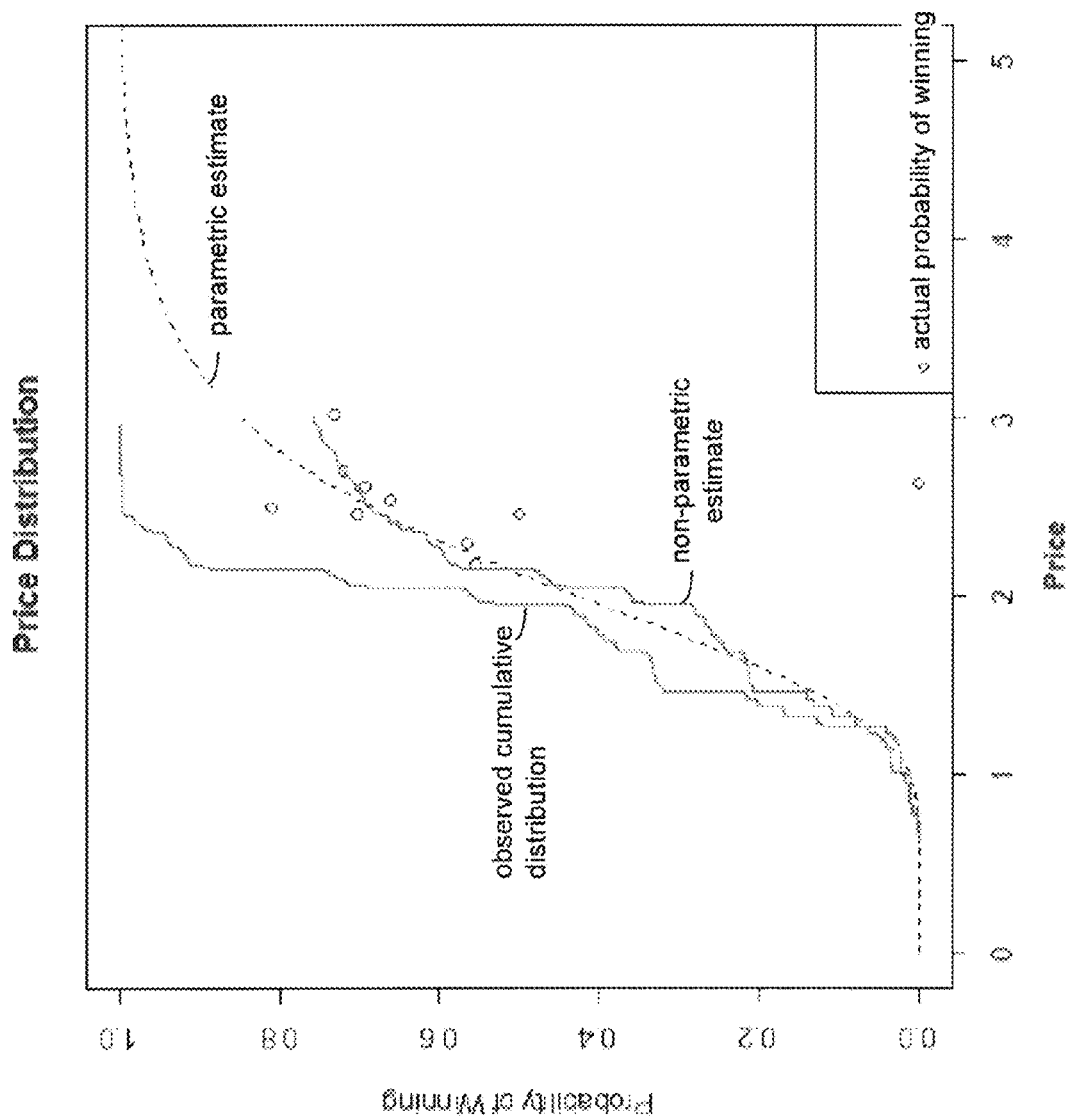
FIG. 12 illustrates a graph with exemplary price distribution curves, according to one embodiment.

Therefore, given (or assuming) a price distribution F and using the likelihood function $L(\theta)$, estimates of the distributional parameters of the price distribution are computed either analytically or through optimization. A price distribution curve is fitted to the price distribution based on the distributional parameters. The price distribution curve may follow a parametric price distribution, or a non-parametric price distribution (e.g., the Kaplan-Meier estimator). FIG. 12 illustrates a graph with exemplary price distribution curves, according to one embodiment. A desired bid price for an advertisement placement may be determined by a price point lying on the price distribution curve, while ensuring that performance of the advertisement placement is maintained. This is applied to bid-win-loss data collected from the bidding system, so that the optimization system accurately estimates the full price distribution of advertisement placements, including advertisement placements that are losing bids.

Pacing Optimization

Another aspect of the present system and method is pacing optimization. One of the significant challenges of achieving good campaign performance is correct pacing (hitting the daily impression/volume goal). Correct pacing also refers to using as few placements as possible so that only the very best placements are used. An optimal situation is where advertisements are served every minute of the day so that by the last minute of the day, the last few impressions that are needed to hit that day's impression quota/goal are being served.

One method for pacing optimization is to observe how many impressions a campaign served, how many placements it used, and which hours of the day it served. Because very different impression volumes occur every hour of the day, the system normalizes these numbers to estimate a placement velocity. Placement velocity refers to the average number of impressions that a placement will see throughout the day for a given campaign with a static set of DZs and a known point in the price distribution. Based on the number of impressions needed in the day, the system uses placement velocity to estimate the number placements needed to reach that goal.

Another method for pacing optimization may offer better pacing control from a mechanical point view because some campaigns run with hourly impression quotas that aim to meet a day's impression quota. To maximize the minutes served in the day, the system estimates the number of placements to assign a campaign for the day. Now, under this embodiment, the system estimates the number of impressions to allocate to each hour so as to fill each hour of the day. This is done by iteratively moving impression quota from hours that do not meet their quota to hours that meet their quota too quickly.

Yet another method for pacing optimization is to dynamically change the number of placements that are bid on periodically to adjust for volume fluctuations throughout the day.

According to another embodiment, the present system re-weights hours to bias impressions towards better performing hours. To ensure smooth serving throughout the day, the system assigns more placements to better performing hours compared to poorer performing hours. Each hour of the day performs equally well. In other words, for hours that perform well, the system selects below average performing advertisement placements as they will now perform adequately. Whereas for poor performing hours, the system drops some better placements as they will perform below what is needed. The system can perform this process for the optimization of DZs, as well.

Mixed Optimization

Another aspect of the present system and method is to apply some or all of the optimization methods discussed above simultaneously instead of in a tiered process in order to achieve a target performance metric at an efficient price point. As an example, the system provides a clear measure of how effective each placement, DZ and hour is. The system creates a final score that is, for instance, a function of placement, DZ and hour.

The core idea here is that there are K dimensions for optimizing performance (e.g. placement, time, DZ, demographics/audience attributes, etc.). The system is able to score each dimension alone. The extension of mixed optimization is (for each bid request) to estimate 1 score that jointly considers all other scores. Thus, it is some function F(score1, score2, . . . , scoreK).

According to one embodiment, the system computes a multiplicative score where each dimension is centered around 1. If the system (e.g., during a bid on an RTB exchange) identifies a DZ having a score of 1.5, an advertisement placement having a score of 1.2, and an hour having a score of 0.8, the final score for a bid request would be 1.44. If the system is targeting bid requests with a score greater than 1, the system would bid on this item. If too few impressions are being won, the system may increase the bid price to a maximum acceptable point, or lower the target score iteratively until impressions are won at the desired rate to meet that daily impression quota.

According to one embodiment, the present system and method provides an opportunity for bidders to consider or buy a rather poor performing placement that would never previously have been considered. The present method and system allows the bidders to place advertisements in a prime hour in the high performing DZ, thus providing more choices to bid with an improved performance.

Binomial Estimation for Eliminating Placements

As explained above, grouping advertisement placements into different advertisement segments allows probabilistic statements to be made because probabilistic statements require a sample. The present system solves the problem of determining the size of the sample required to make a probabilistic statement that is statistically significant. For instance, if X clicks are observed given Y impressions for an advertisement placement, the system ensures that the observed CTR of the advertisement placement is outperforming a target CTR ("tCTR").

It has been observed that clicks can be modeled fairly accurately under a binomial assumption. The probability p of an impression being clicked by a user is the same for each impression in the same set of impressions. Under the binomial assumption and setting p=tCTR, the probability P that the observed CTR ("oCTR") is greater than the target CTR (e.g., outperforming target CTR) is calculated by:

$$P(oCTR > tCTR) = \sum_{i=k}^{n} \frac{n!}{(n-i)!i!}(p^i)((1-p)^{n-i}),$$

where n is the number of observed impressions and k is the number of observed clicks.

To ensure that the observed CTR is large enough to support, for instance, at least a 20% confidence level (p value) that the observed CTR is outperforming the target CTR for a given number of observed impressions n, the number of observed clicks k is to be determined. To solve for k using the equation above takes significant computational resources. A less computationally intensive way to solve for k is to implement a look up table. However, given that k needs to be calculated for thousands or even millions of advertisement placements, lookup tables would not be a practical solution.

Figure 5:
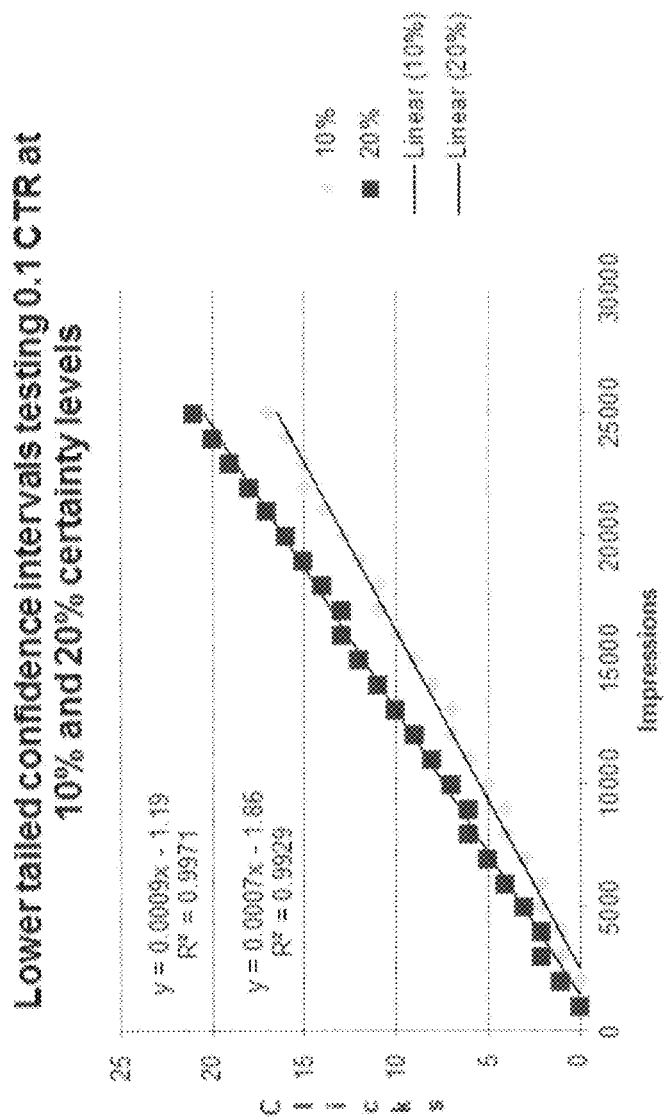
FIG. 5 illustrates an exemplary linear relationship for confidence levels 10% and 20% with tCTR=0.1%, according to one embodiment.

The present system and method provides efficient estimation for k without consuming much computational resources. The estimation for k is based on the observation that the number of observed clicks k for a given confidence level exhibits a linear relationship with respect to the number of impressions n. FIG. 5 illustrates an exemplary linear relationship for confidence levels 10% and 20% with tCTR=0.1%, according to one embodiment.

Figure 6:
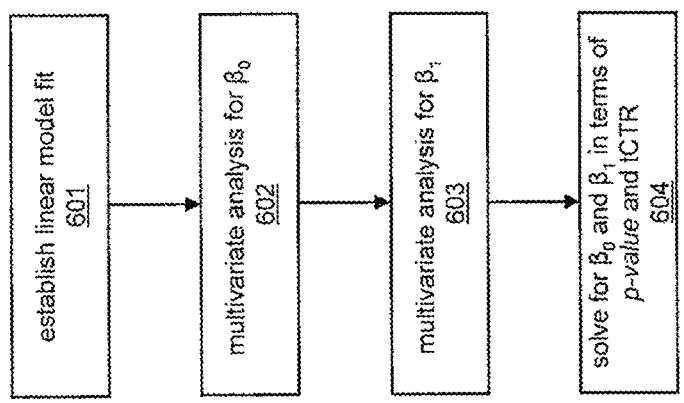
FIG. 6 illustrates a flow chart of an exemplary process for estimating the number of observed clicks for a given confidence level, according to one embodiment.

FIG. 6 illustrates a flow chart of an exemplary process for estimating the number of observed clicks k for a given confidence level, according to one embodiment. Starting at step 601, a linear model fit is established using data points calculated based on the equation for the probability P. The linear model fit yields coefficients $\beta_0$, $\beta_1$ and $\beta_2$.

$$\text{clicks confidence boundary} = \beta_0 + \beta_1 \times \sqrt{\text{impressions}} + \beta_2 \times \text{impressions}$$

At step 602, a multivariate regression analysis is performed on the coefficient $\beta_0$ where the p-value and the tCTR are the explanation variables, where $$\beta_0 = tCTR + pvalue$$

$$\beta_1 = tCTR; \text{ and}$$

$$\beta_2 = pvalue$$

During the multivariate regression analysis, more coefficient $\beta_0$ values may be calculated by varying p-value and tCTR. Step 601 is repeated to yield a set of coefficients $\beta_0$ and $\beta_1$. Similarly, at step 603, another multivariate regression analysis is performed on the coefficient $\beta_1$ where the p-value and the tCTR are the explanation variables using the set of coefficients $\beta_0$ that are already calculated at step 602. Finally, at step 604, coefficients $\beta_0$ and $\beta_1$ are solved for in terms of p-value and tCTR and plugged back into the linear model fit established in step 601.

It is noted that the above description encompassing FIGS. 5 and 6 illustrates one example according to one embodiment, and other variations to the multivariate regression analysis may be used without deviating from the scope of the present subject matter. For example, it is possible to define and approximate a four-dimensional space {p-value, CTR, impressions, clicks} or in terms of a binomial theory {p-value, p, trials, successes}. Instead of the discrete binomial equation to solve for confidence intervals, the four-dimensional space is approximated with a series of linear equations. When three of the four components of the four-dimensional space are known, it becomes a simple multiplication problem. As a result, given the three components including the desired target CTR, the level of confidence, and the number of impressions served, simple multiplication operations determine the minimum number of clicks needed for that target CTR to be true or better than the desired target CTR. Using these results, the present system decides with reasonable certainty when to stop bidding on a given placement based on the likelihood that its performance is below the desired target CTR for that campaign. When the system stops bidding, it would be better to start fresh bidding on a new placement that was chosen from the previously described estimation/recommendation system.

Figure 7:
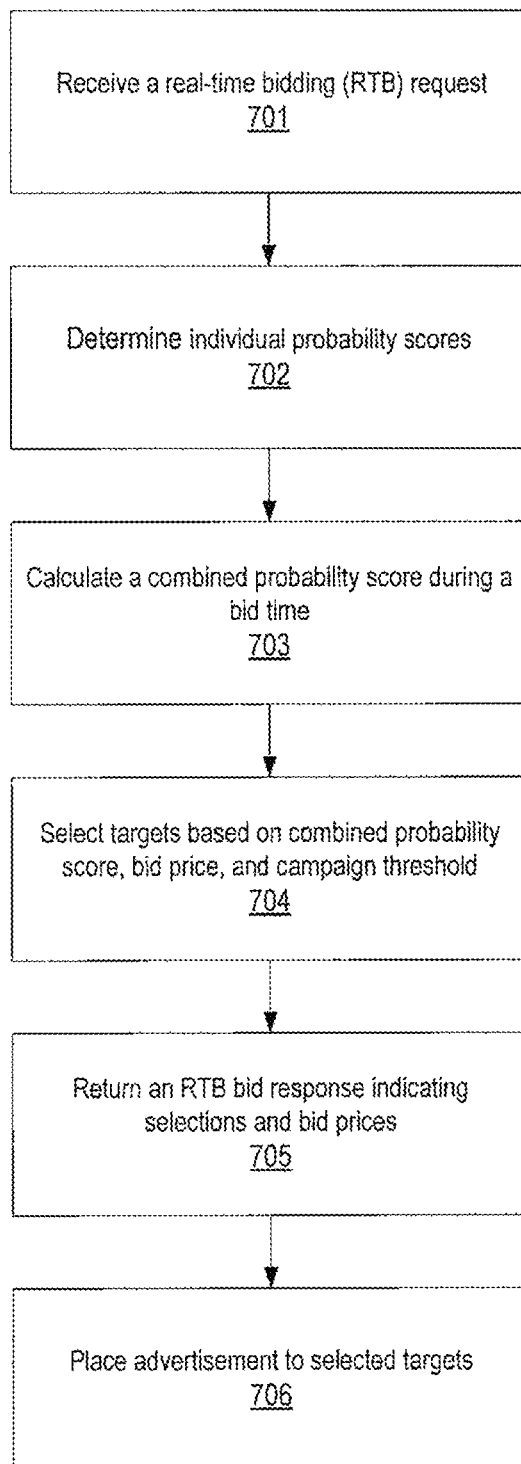
FIG. 7 illustrates a flow-chart of an exemplary process for calculating a combined probability score, according to one embodiment.

FIG. 7 illustrates a flow-chart of an exemplary process for calculating a combined probability score, according to one embodiment. An RTB system receives a real-time bidding (RTB) request from an advertisement exchange that desires to place an online advertisement campaign (701). The RTB system determines individual probability scores (702). During a bid time, when a target appears and/or becomes available for placing an impression for the campaign, the RTB system calculates a combined probability score (703). The RTB system then selects targets for placing an impression based on the combined probability score, the bid price, and the campaign threshold (704). The RTB system returns a RTB bid response to bidders with selections made and the bid prices (705). The RTB system finally places the impression to the available targets and updates the target count (706).

Figure 9:
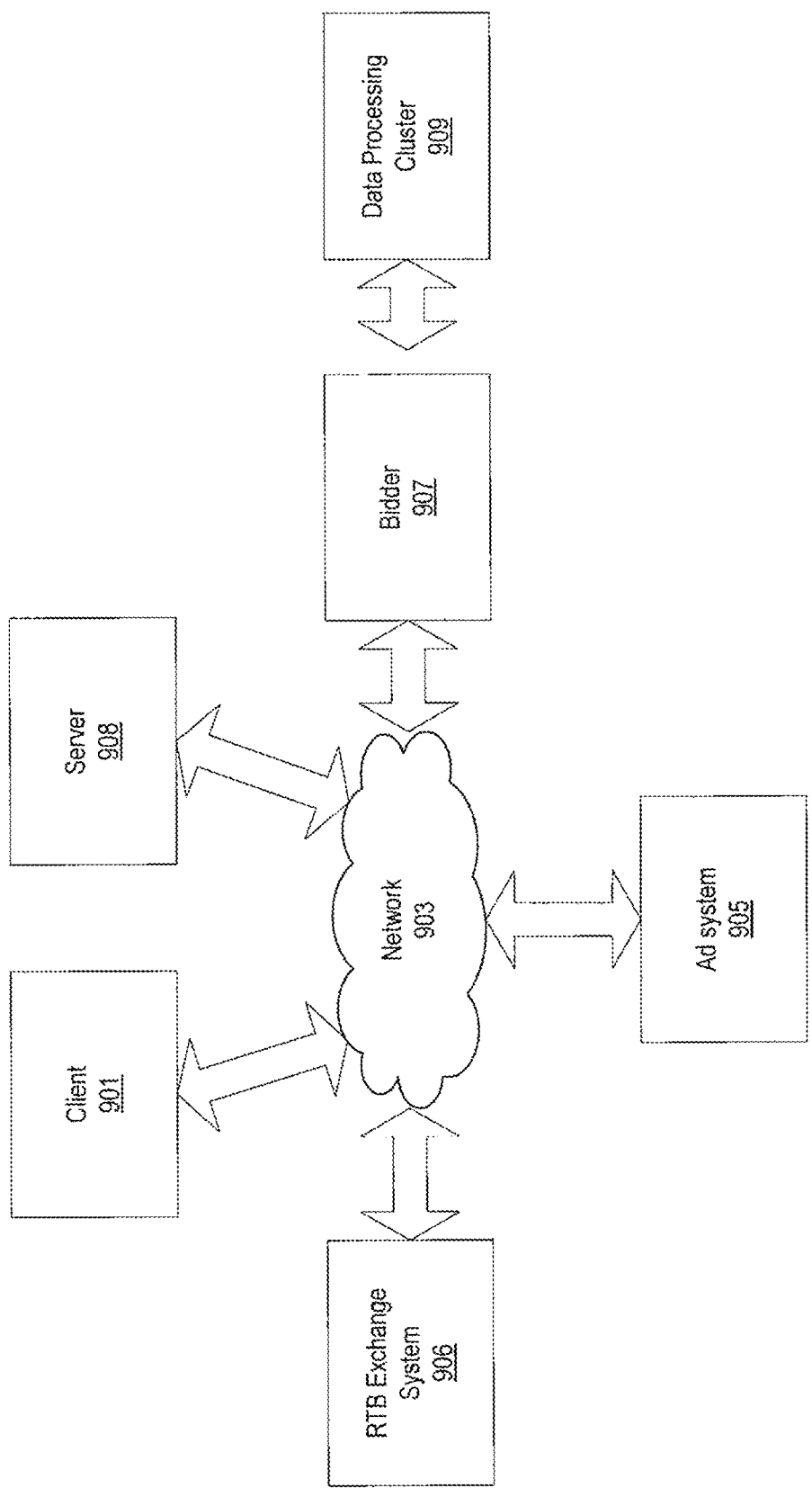
FIG. 9 illustrates an exemplary system level architecture for use with the present system, according to one embodiment.

FIG. 9 illustrates an exemplary system level architecture for use with the present system, according to one embodiment. A client 901 having a browser views a webpage hosted by a server 908. An RTB system 906 receives biddings from one or more bidders 907. Bidders 907 and/or advertisement systems 905 can select an appropriate advertisement and place the selected advertisement to the client 901 on a webpage of the server 908. A data processing cluster 909 processes all data to provide bidding rules for the bidders 907.

Figure 10:
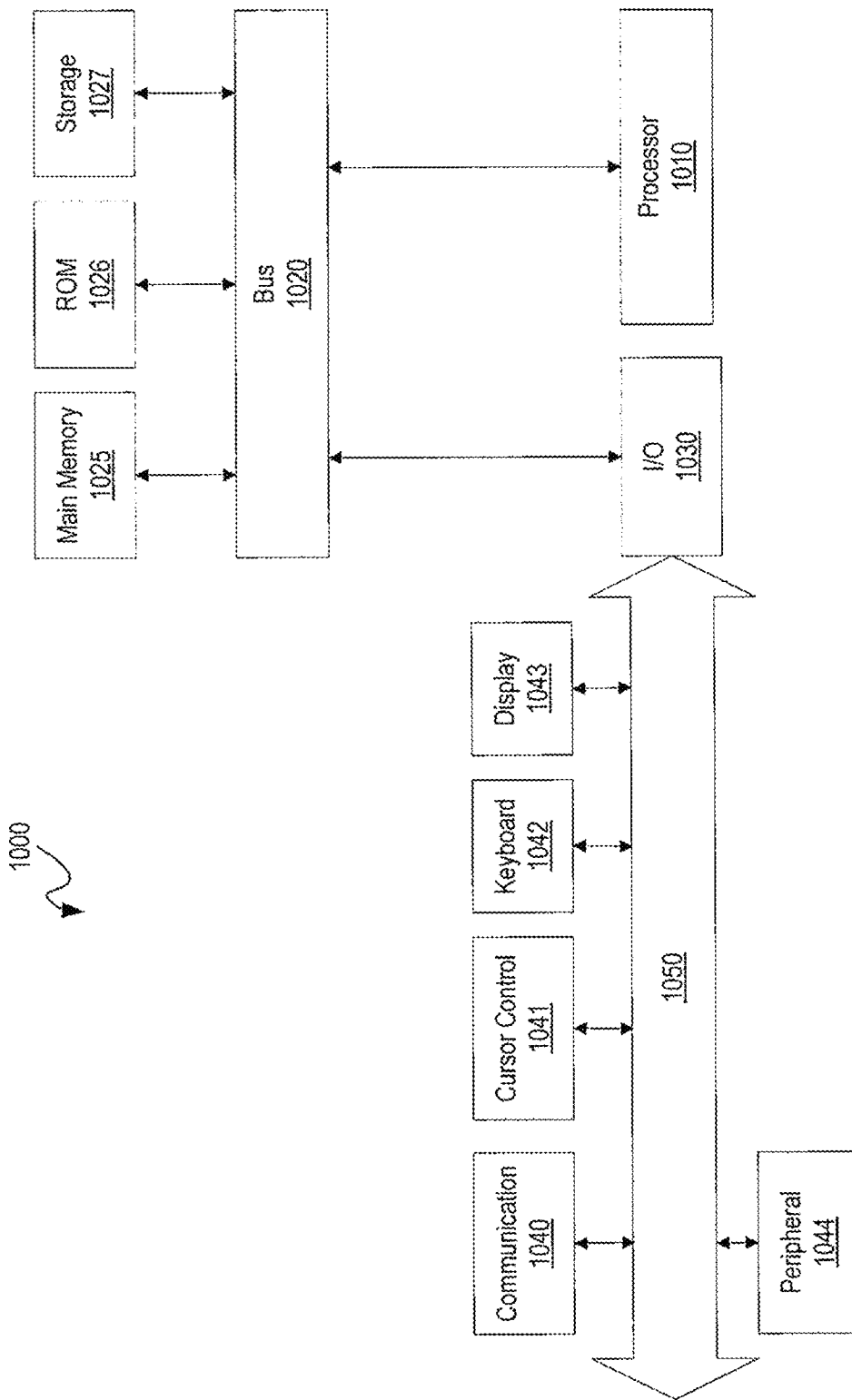
FIG. 10 illustrates an exemplary computer architecture that may be used for the present system, according to one embodiment.

FIG. 10 illustrates an exemplary computer architecture that may be used for the present system, according to one embodiment. The exemplary computer architecture may be used for implementing one or more components described in the present disclosure including, but not limited to, the present system. One embodiment of architecture 1000 comprises a system bus 1020 for communicating information, and a processor 1010 coupled to bus 1020 for processing information. Architecture 1000 further comprises a random access memory (RAM) (referred to herein as main memory) or other dynamic storage device 1025, coupled to bus 1020 for storing information and instructions to be executed by processor 1010. Main memory 1025 also may be used for storing temporary variables or other intermediate information during execution of instructions by processor 1010. Architecture 1000 may also include a read only memory (ROM) and/or other static storage device 1026 coupled to bus 1020 for storing static information and instructions used by processor 1010.

A data storage device 1025 such as a magnetic disk or optical disc and its corresponding drive may also be coupled to architecture 1000 for storing information and instructions. Architecture 1000 can also be coupled to a second I/O bus 1050 via an I/O interface 1030. A plurality of I/O devices may be coupled to I/O bus 1050, including a display device 1043, an input device (e.g., an alphanumeric Input device 1042 and/or a cursor control device 1041).

The communication device 1040 allows for access to other computers (e.g., servers or clients) via a network. The communication device 1040 may comprise one or more modems, network interface cards, wireless network interfaces or other interface devices, such as those used for coupling to Ethernet, token ring, or other types of networks.

Figure 11:
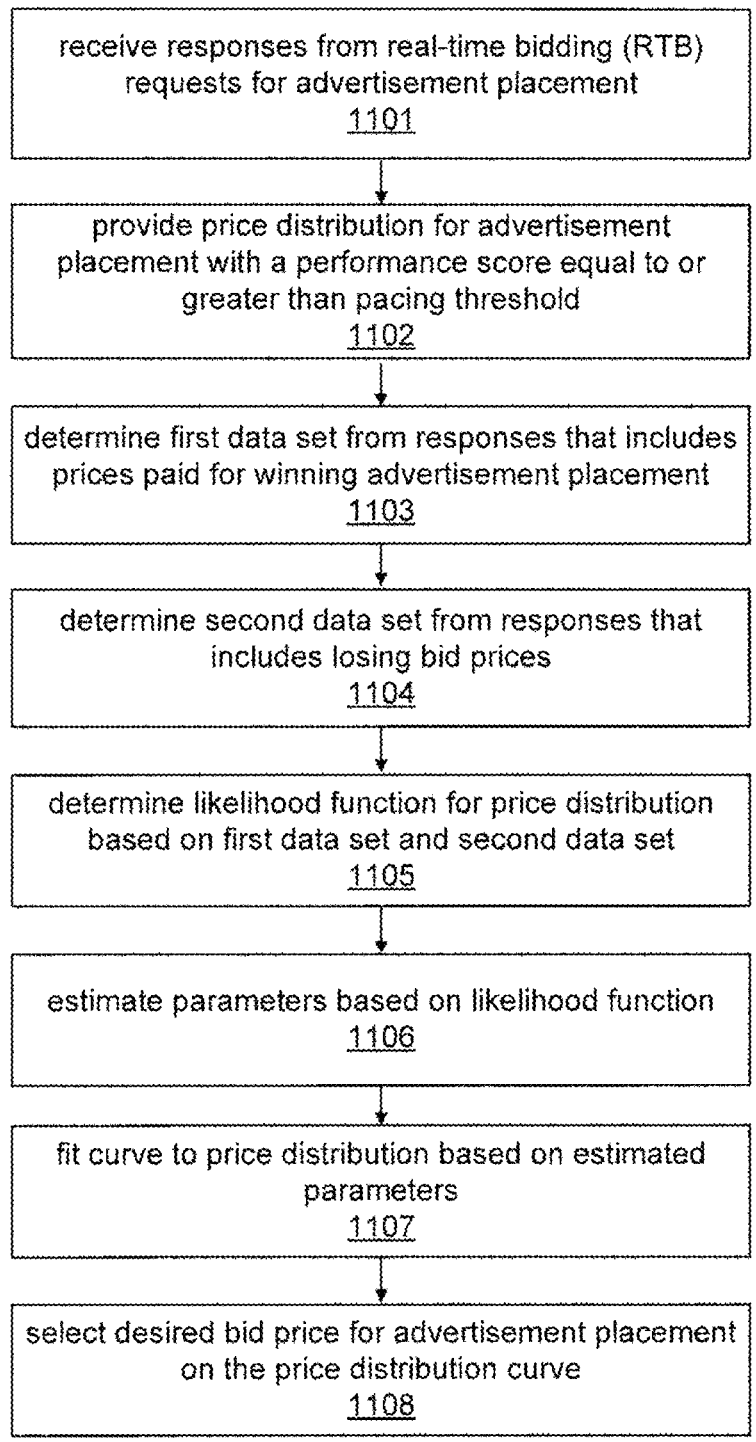
FIG. 11 illustrates a flow chart of an exemplary process for pricing an advertisement placement, according to one embodiment.

FIG. 11 illustrates a flow chart of an exemplary process for pricing an advertisement placement, according to one embodiment. At 1101, responses from real-time-bidding (RTB) requests for an advertisement placement is received. At 1102, a price distribution for the advertisement placement with a performance score equal to or greater than a pacing threshold is provided. At 1103, a first data set from the responses that includes prices paid for winning the advertisement placement is determined. According to one embodiment, the prices paid for winning the advertisement placement is lower than or equal to the winning bid prices (e.g., in a second price auction). At 1104, a second data set from the responses that includes losing bid prices is determined. According to one embodiment, the losing bidder does not know the winning bid price. At 1105, a likelihood function for the price distribution of the advertisement placement Is determined based on the first data set and the second data set. According to one embodiment, the first data set and the second data set contribute data points to the likelihood function. In particular, the first data set contribute uncensored data points to the likelihood function, while the second data set contribute right-censored data points of a survival function to the likelihood function. At 1106, parameters of the price distribution are determined based on the likelihood function. At 1107, a curve to the price distribution is fitted based on the parameters. At 1108, a desired bid price for the advertisement placement on the price distribution curve is determined. This ensures that the desired bid price maintains the same level of performance.

A system and method for pricing advertisement placements online in a real-time bidding environment based on expected volume, scoring and ranking has been disclosed. It is understood that the embodiments described herein are for the purpose of elucidation and should not be considered limiting the subject matter of the disclosure. Various modifications, uses, substitutions, combinations, Improvements, methods of productions without departing from the scope or spirit of the present invention would be evident to a person skilled in the art.

We claim:

1. A computer-implemented method for automated pricing evaluation for a particular online placement and real-time bidding control based on the automated pricing evaluation in an automated real-time bidding (RTB) environment, the method comprising:
   receiving, at an RTB bidding system, from an RTB exchange, a series of bid requests for the particular online placement, each bid request identifying the particular online placement in network-based digital content being loaded or rendered by a respective internet-connected device;
   for each of a plurality of the received bid requests for the particular online placement, determining by the RTB bidding system (a) to submit a bid to the RTB exchange for the particular online placement and (b) a bid price for the bid;
   wherein each bid submitted by the RTB bidding system is included in an auction for the online placement identified in the respective bid request and, via the auction, results in a winning bid or a losing bid;
   wherein the RTB exchange implements a second price auction, such that:
     for each of a plurality of winning bids submitted by the RTB bidding system for the particular online placement, the RTB bidding system is informed of a price paid by the RTB bidding system for the particular online placement, as determined by the RTB exchange;
     for each of a plurality of losing bids submitted by the RTB bidding system for the particular online placement, the RTB bidding system is not informed of the price paid for the particular online placement;

collecting, by the RTB bidding system, a first data set including the respective price paid for the particular online placement for each of the plurality of winning bids submitted by the RTB bidding system for the particular online placement, wherein for at least some winning bids the respective price paid is lower than the bid price of the winning bid;

collecting, by the RTB bidding system, a right-censored second data set including the losing bid price submitted by the RTB bidding system for each of the plurality of losing bids submitted by the RTB bidding system for the particular online placement, the losing bid prices defining right-censored data points;

calculating an estimated market price distribution curve for the particular online placement based on the first data set and the second data set by:
  selecting a statistical model representing an actual market price distribution for the second price auction implemented by the RTB exchange, the statistical model accounting for right-censored data;
  fitting the model to the first data set and the right-censored second data set to generate an estimated market price distribution curve for the particular online placement, the estimated market price distribution curve representing a distribution of prices paid for the particular online placement by a market of bidders of over time;

subsequently receiving, at the RTB bidding system, at least one additional bid request for the particular online placement; and for each received additional bid request, the RTB bidding system determining, based on the calculated estimated market price distribution curve, at least one of (a) whether to submit a bid for the additional bid request or (b) a bid price for the additional bid request.

2. The computer-implemented method of claim 1, further comprising calculating a parameter of the estimated market price distribution curve based on a likelihood function.

3. The computer-implemented method of claim 1, further comprising selecting the particular online placement from a plurality of advertisement placements, wherein the particular online placement has a performance score equal to or greater than a pacing threshold.

4. The computer-implemented method of claim 3, further comprising selecting a desired bid price for the particular online placement on the estimated market price distribution curve, wherein the desired bid price is based on maintaining the performance score equal to or greater than the pacing threshold.

5. The computer-implemented method of claim 2, further comprising contributing the second data set as right-censored data points to a survival function, wherein the survival function is part of the likelihood function.

6. The computer-implemented method of claim 2, further comprising contributing the first data set as uncensored data points to the likelihood function.

7. The computer-implemented method of claim 1, wherein the estimated market price distribution curve follows a parametric distribution.

8. The computer-implemented method of claim 1, wherein the estimated market price distribution curve follows a non-parametric distribution.

9. The computer-implemented method of claim 4, further comprising determining the performance score based on a number of impressions served and feedback data comprising clicks, online actions and sales data.

10. The computer-implemented method of claim 1, wherein in the second price auction implemented by the RTB exchange, in auctions for the particular online placement that include multiple bids having different bid prices, the price paid for the particular online placement is lower than the highest of the multiple bid prices.

11. A non-transitory computer readable medium having stored thereon computer-readable instructions for automated pricing evaluation for a particular online placement and real-time bidding control based on the automated pricing evaluation in an automated real-time bidding (RTB) environment, and a processor coupled to the non-transitory computer readable medium, wherein the computer-readable instructions are executable by the processor to:
  receive, at an RTB bidding system, from an RTB exchange, a series of bid requests for the particular online placement, each bid request identifying the particular online placement in network-based digital content being loaded or rendered by a respective internet-connected device;
  for each of a plurality of the received bid requests for the particular online placement, determine, by the RTB bidding system (a) to submit a bid to the RTB exchange for the particular online placement and (b) a bid price for the bid;
  wherein each bid submitted by the RTB bidding system is included in an auction for the online placement identified in the respective bid request and, via the auction, results in a winning bid or a losing bid;
  wherein the RTB exchange implements a second price auction, such that:
    for each of a plurality of winning bids submitted by the RTB bidding system for the particular online placement, the RTB bidding system is informed of a price paid by the RTB bidding system for the particular online placement, as determined by the RTB exchange;
    for each of a plurality of losing bids submitted by the RTB bidding system for the particular online placement, the RTB bidding system is not informed of the price paid for the particular online placement;
  collect, by the RTB bidding system, a first data set including the respective price paid for the particular online placement for each of the plurality of winning bids submitted by the RTB bidding system for the particular online placement;
  collect, by the RTB bidding system, a right-censored second data set including the losing bid price submitted by the RTB bidding system for each of the plurality of losing bids submitted by the RTB bidding system for the particular online placement, the losing bid prices defining right-censored data points;
  calculate an estimated market price distribution curve for the particular online placement based on the first data set and the second data set by:
    selecting a statistical model representing an actual market price distribution for the second price auction implemented by the RTB exchange, the statistical model accounting for right-censored data;
    fitting the model to the first data set and the right-censored second data set to generate an estimated market price distribution curve for the particular online placement, the estimated market price distribution curve representing a distribution of prices paid for the particular online placement by a market of bidders of over time;

subsequently receive, at the RTB bidding system, at least one additional bid request for the particular online placement; and for each received additional bid request, determine, based on the calculated estimated market price distribution curve, at least one of (a) whether to submit a bid for the additional bid request or (b) a bid price for the additional bid request.

12. The non-transitory computer readable medium of claim 11, wherein the processor executes the instructions to calculate a parameter of the estimated market price distribution curve based on a likelihood function.

13. The non-transitory computer readable medium of claim 11, wherein the processor executes the instructions to select the particular online placement from a plurality of advertisement placements, wherein the particular online placement has a performance score equal to or greater than a pacing threshold.

14. The non-transitory computer readable medium of claim 13, wherein the processor executes the instructions to select a desired bid price for the particular online placement on the estimated market price distribution curve, wherein the desired bid price is based on maintaining the performance score equal to or greater than the pacing threshold.

15. The non-transitory computer readable medium of claim 12, wherein the processor executes the instructions to contribute the second data set as right-censored data points to a survival function, wherein the survival function is part of the likelihood function.

16. The non-transitory computer readable medium of claim 12, wherein the processor executes the instructions to contribute the first data set as uncensored data points to the likelihood function.

17. The non-transitory computer readable medium of claim 11, wherein the estimated market price distribution curve follows a parametric distribution.

18. The non-transitory computer readable medium of claim 11, wherein the estimated market price distribution curve follows a non-parametric distribution.

19. The non-transitory computer readable medium of claim 14, wherein the processor executes the instructions to determine the performance score based on a number of impressions served and feedback data comprising clicks, online actions and sales data.

20. The non-transitory computer readable medium of claim 11, wherein in the second price auction implemented by the RTB exchange, in auctions for the particular online placement that include multiple bids having different bid prices, the price paid for the particular online placement is lower than the highest of the multiple bid prices.

21. The computer-implemented method of claim 1, wherein for at least some winning bids submitted by the RTB bidding system for the particular online placement, the price paid by the RTB bidding system for the particular online placement is defined by a next highest bid price submitted by another bidding system.

* * * * *